(12) United States Patent
Berthaud et al.

(10) Patent No.: US 8,195,486 B2
(45) Date of Patent: Jun. 5, 2012

(54) AIRLINE TICKET CHANGE CONSTRAINER

(75) Inventors: Sébastien Berthaud, Antibes (FR);
Thierry Dufresne, Opio (FR); Hervé Prezet, Mougins (FR); Jean-Paul Otmani, La Martre (FR); Fraidoun Sultani, Grasse (FR)

(73) Assignee: Amadeus s.a.s, Biot (FR)

( * ) Notice: Subject to any disclaimer, the term of this patent is extended or adjusted under 35 U.S.C. 154(b) by 834 days.

(21) Appl. No.: 11/599,380

(22) Filed: Nov. 15, 2006

(65) Prior Publication Data
US 2008/0114621 A1     May 15, 2008

(51) Int. Cl.
*G06Q 10/00* (2012.01)
*G06F 17/00* (2006.01)
*G06G 7/00* (2006.01)

(52) U.S. Cl. .............................. 705/5; 705/7.11; 705/400

(58) Field of Classification Search ........................ None
See application file for complete search history.

(56) References Cited

U.S. PATENT DOCUMENTS

| | | | |
|---|---|---|---|
| 6,085,169 A * | 7/2000 | Walker et al. | 705/26 |
| 6,377,932 B1 * | 4/2002 | DeMarcken | 705/5 |
| 2002/0069118 A1 * | 6/2002 | Zylstra | 705/26 |
| 2002/0156715 A1 | 10/2002 | Wall et al. | |
| 2002/0178034 A1 | 11/2002 | Gardner et al. | |
| 2005/0004820 A1 * | 1/2005 | LeMieux | 705/5 |
| 2006/0064333 A1 | 3/2006 | Razza et al. | |
| 2008/0004917 A1 | 1/2008 | Mortimore | |
| 2008/0010101 A1 | 1/2008 | Williamson et al. | |
| 2008/0010102 A1 | 1/2008 | Williamson et al. | |
| 2008/0010103 A1 | 1/2008 | Williamson et al. | |
| 2008/0010104 A1 | 1/2008 | Williamson et al. | |
| 2008/0027768 A1 | 1/2008 | Thurlow et al. | |
| 2008/0041945 A1 * | 2/2008 | Williamson et al. | 235/384 |
| 2008/0091481 A1 | 4/2008 | Messa et al. | |

* cited by examiner

*Primary Examiner* — John Hayes
*Assistant Examiner* — George Chen
(74) *Attorney, Agent, or Firm* — Young & Thompson

(57) ABSTRACT

A ticket change constrainer which allows reissuing or revalidating an already issued airline ticket includes a ticket change domain reducer operable to reduce an input search domain of change opportunities on the basis of change conditions set in the already issued ticket. It also includes a ticket change valuer operable to weigh the change opportunities of the reduced search domain and to return a reduced valued search domain of change opportunities. The weighing of the change opportunities is done on the basis of pricing method popularity scores updated in a ticket change memory by a ticket change watcher agent from actual change transactions handled by the system. The change conditions include standard pricing methods of the airline industry. The input search domain of change opportunities is produced by a conventional fare-driven search engine on the basis of a ticket change request issued by an end-user of the system.

14 Claims, 9 Drawing Sheets

Prior Art

| Scenario | Pricing Method |
|---|---|
| 01 | Keep the fares of the original ticket |
| 02 | Use fares valid at ticket issue. |
| 03 | -Keep the fares of the original ticket for fully traveled part of the journey;<br>-Use today fares for not traveled part of the journey. |
| 04 | -Keep the fares of the original ticket for fully changed part of the journey;<br>-Use today fares for not changed part of the journey. |
| 05 | Use today fares |
| 06 | IATA Reissue Provisions |
| 07 | Use today fare and keep fare construction |
| 08 | Cancel and Start Over |
| 09 | -Use fares valid at ticket issue for fully traveled part of the journey;<br>-Use today fares for not traveled part of the journey. |
| 10 | -keep the fares of the original ticket for changed part of the journey;<br>-Use today fares for not changed part of the journey. |
| 11 | -keep the fares of the original ticket for changed part of the journey;<br>-Use fares valid at ticket issue for not changed part of the journey. |

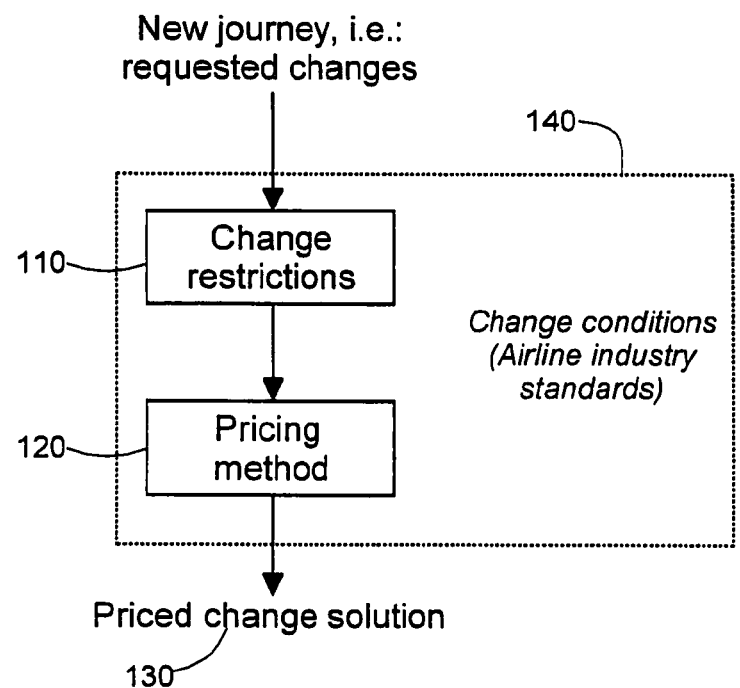

FIG.1

AIRLINE TICKET CHANGE CONSTRAINER

FIELD OF THE INVENTION

The present invention relates to the field of travel ticketing and more specifically relates to the re-issuance of airline travel tickets.

BACKGROUND OF THE INVENTION

In the travel and airline industries a significant fraction of all tickets that are issued by airlines and other travel service providers are reissued at least once before travel on the ticket is completed. Changes that are requested by travelers include changing flights, dates and routes possibly to/from a new travel destination or origin. If revalidation of a ticket to accommodate a relatively simple change is often possible, reissuing a ticket is always a complex and time-consuming job that must be handled by a skilled travel agent.

Among the practices and tools in use by airlines and travel agencies to reissue a ticket some are said to be flight-driven. Their use implies that traveler has first to decide on all the characteristics of the new desired journey, i.e.: origin, destination, every via point (that may be different for outgoing and incoming parts of a return journey), flight number of each travel segment, dates and times of every flight. Given this information, a priced solution that must also fit the change conditions set by the first issued ticket can generally be returned. However, to achieve this, a large or very large number of travel possibilities must always be considered by the travel agent in an attempt to satisfy the end-user request. On top of being a time consuming operation this does not always provide the cheapest solution. The process lacks of consistency since the result is highly dependent on what travel agent considers for reissuing the ticket.

Ticket revalidation, which does not require the issuance of a new ticket, can apply only when minor changes such as flight changes or date changes are requested. Like above, revalidation process is flight-driven. It first checks if the change requested can actually be accommodated which does not prevent travel agent from having to try numerous possible routes and flights though. Finding the cheapest solution is not guaranteed and is highly dependent on travel agent skill and experience too. This latter must also make sure that the change conditions attached to the first issued ticket are actually observed.

Another category of tools for reissuing a ticket are said to be fare-driven. If those tools are devised to return the cheapest solution this is however obtained at the expense of ignoring, if not all, at least most of the change conditions which are published as standards by the airline industry. Indeed, those tools are generally limited to collect a change fee.

According to airline industry standards, the change conditions for a fare are published through scenarios. A scenario contains two kinds of constraints: the change restrictions and the pricing method to be used.

The change restrictions specify which changes are allowed regarding the new dates, origins, destinations, routes and flights. They include criterions such as: the fare category present in the original ticket; the passenger type; if the change is requested before or after passenger departure; if the change is requested before or after flight departure; the destination point; the change penalty.

The pricing method specifies how to price the new journey; in particular, which fares are to be used on which part of the journey, i.e.: fares valid when the first ticket was booked and fares valid when the change is requested.

Examples of pricing methods currently specified are shown in table (100) of FIG. 1.

Airline standards assume that changes are carried out according to the process flow as shown in FIG. 1. Namely, the requested changes are checked against the change restrictions (110). According to the result of the checking, the pricing method to use is selected (120) allowing to build a priced change solution (130) that indeed meets the change conditions of airline standards (140).

Reissuing and, at a lesser extent, revalidating a ticket is thus no simple matter. It requires skilled travel agents and it is a time consuming, thus a costly activity for airlines and travel agencies.

On the other hand, with the ever-growing use and spreading of the Internet, most of the airline companies offer now the possibility of booking a trip and buy an airline ticket directly from their web servers without the need of visiting a travel agency. There are also a lot of specialized travel web sites, or online travel agencies, that give the opportunity to the end-users of those sites to buy travel tickets directly. Incidentally, in both cases, the ticket is most often 'de-materialized' (e-ticket) since no real ticket is ever issued and customer has just to show up to the airport airline counter with an ID e.g., a passport, to get its boarding pass. The amount of tickets issued through this channel is growing very rapidly. Irrespective of the fact tickets are 'de-materialized' or not they are equally susceptible to be changed while there is no actual possibility offered of reissuing a ticket from those web sites.

It is thus a broad object of the invention to overcome the difficulties, here above discussed, of reissuing and revalidating a travel ticket while meeting the change conditions imposed by airline industry standards through an automated process that does not have to rely on the expertise of a travel agent.

It is also an object of the invention that this automated process returns an exhaustive list of travel opportunities all meeting the requested changes and from which a traveler can pick a preferred solution.

It is a further object of the invention that returned travel opportunities always include the cheapest available opportunity.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The invention described a ticket change constrainer which allows reissuing or revalidating an already issued airline ticket. It includes a ticket change domain reducer operable to reduce, i.e. to cut, an input search domain of change opportunities on the basis of change conditions set in the already issued ticket. It also includes a ticket change valuer operable to weigh the change opportunities of the reduced search domain and to return a reduced valued search domain of change opportunities. The weighing of the change opportunities is done on the basis of pricing method popularity scores updated in a ticket change memory by a ticket change watcher agent from actual change transactions handled by the system. The change conditions include standard pricing methods of the airline industry. The input search domain of change opportunities is produced by a conventional fare-driven search engine on the basis of a ticket change request issued by an end-user of the system. The reduced valued search domain of change opportunities returned by the ticket change constrainer always includes a lowest fare opportunity compatible with the change conditions set in the already issued ticket.

BRIEF DESCRIPTION OF THE DRAWINGS

FIG. 1 illustrates state-of-the-art re-issuance of an airline ticket.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Figure 2:
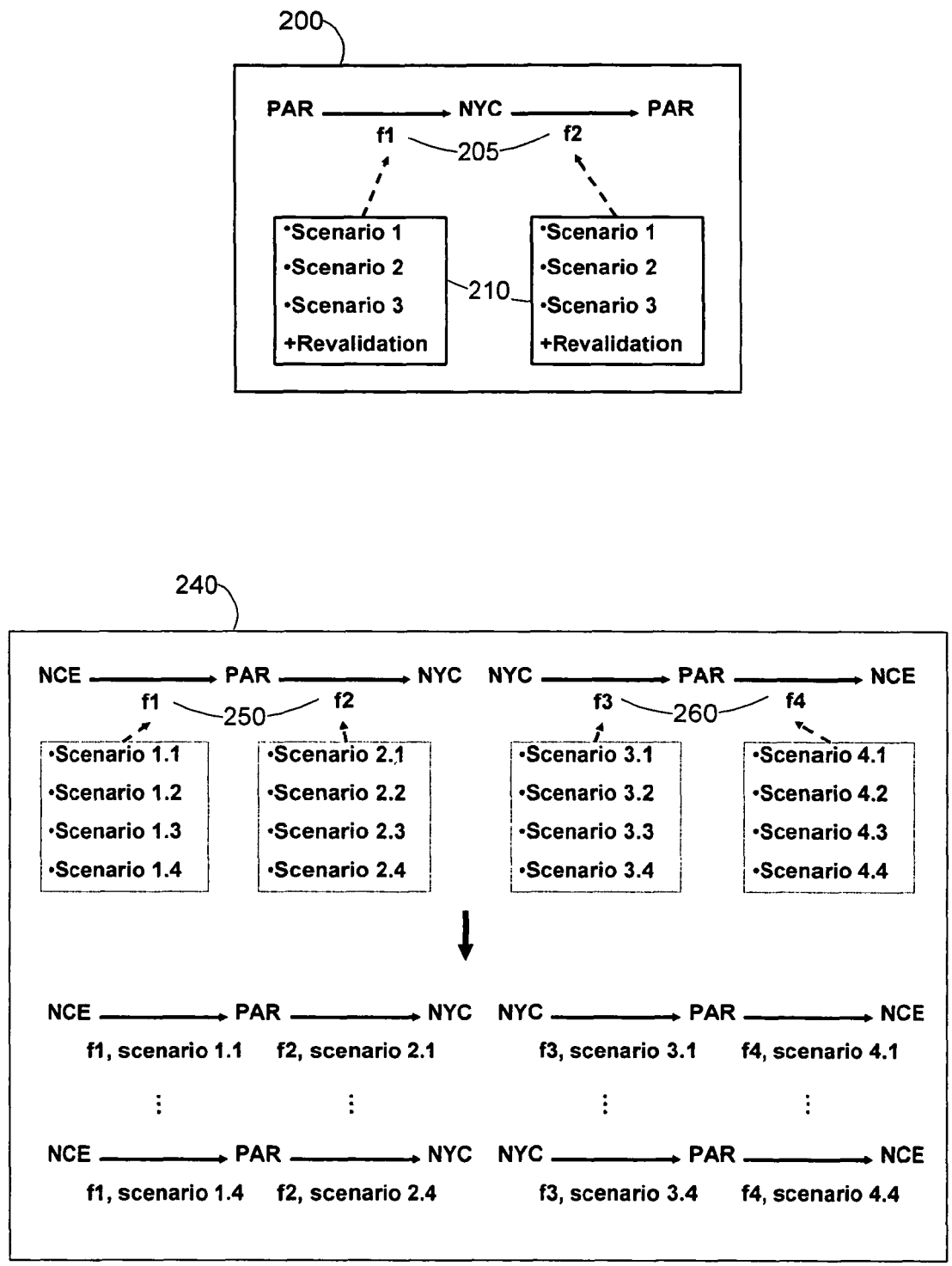
FIG. 2 further discusses the complexity of having to reissue or revalidate an already issued ticket.

FIG. 2 further discusses the complexity of having to reissue or revalidate an already issued ticket. To be fully compliant with the airline industry standards a fare-driven ticket changer according to the invention must be able to handle fare data versions corresponding to fares valid either at issue or reissue time. Therefore, the fare data volume to be handled is significantly bigger than with a standard fare-driven tool product. Moreover, the fare-driven ticket changer must also handle every change condition of the fares priced in the original ticket to actually guarantee the finding of the cheapest solution.

For example, FIG. 2 shows first an original ticket (200) of a very simple round trip between two cities referred to by their IATA (International Air Transport Association) codes as PAR and NYC and priced with only two fares f1 and f2 (205). If we assume that each fare of the original ticket has just three associated reissue policy scenarios (many more fares and scenarios could have to be considered in practice) and one revalidation scenario (210) there are already 10 possible combinations to consider in this straightforward example; i.e.: the 3×3 reissue combinations plus the revalidation one. Also, the number of fares must be doubled as compared to a standard fare driven product since the fares valid when the original ticket was priced and the fares valid at the date of the ticket change request have both to be considered. Hence, in this case, the data volume is actually 2×10, i.e.: 20 times bigger than for a standard fare driven product. Moreover, all these scenarios must be combined together to find the cheapest solution. Considering a fare couple f1-f2 used to price the new journey, each possible scenario of f1 fare must also be combined with each possible scenario of f2 fare. In the example of FIG. 2 there are 4 scenarios per fare, which leads to 16 possible combinations.

Therefore, for a very standard request (240) with two outbound fare components (250), two inbound fare components (260), and an average of four scenarios per fare, the number of scenario combinations is $4^4=256$ times bigger as compared to a standard fare driven request. On top of this, for the reason mentioned above, the number of fares is doubled on each fare component. This leads to have $2^4=16$ times more fare combinations to consider. Finally, the number of pricing solution combinations is thus actually 16×256=4496 times bigger as compared to a standard fare driven request.

Thus, the volume of data to consider is huge as compared to the one a standard fare-driven search tool has to manipulate. Moreover, change scenarios do not impact the fare amount but the validity of the solution being considered. As a consequence, the data cannot be easily discriminated: the fare-driven search tool has to explore the whole solution domain increasing accordingly the CPU (Central Processing Unit) time necessary to retrieve a viable solution. Considering that a conventional fare-driven product needs 1 second of CPU time to find a fare; a fare-driven ticket changer that would have to go through all the combinations, as quantified above, would require 4496 seconds; which does not make sense in practice.

Figure 3:
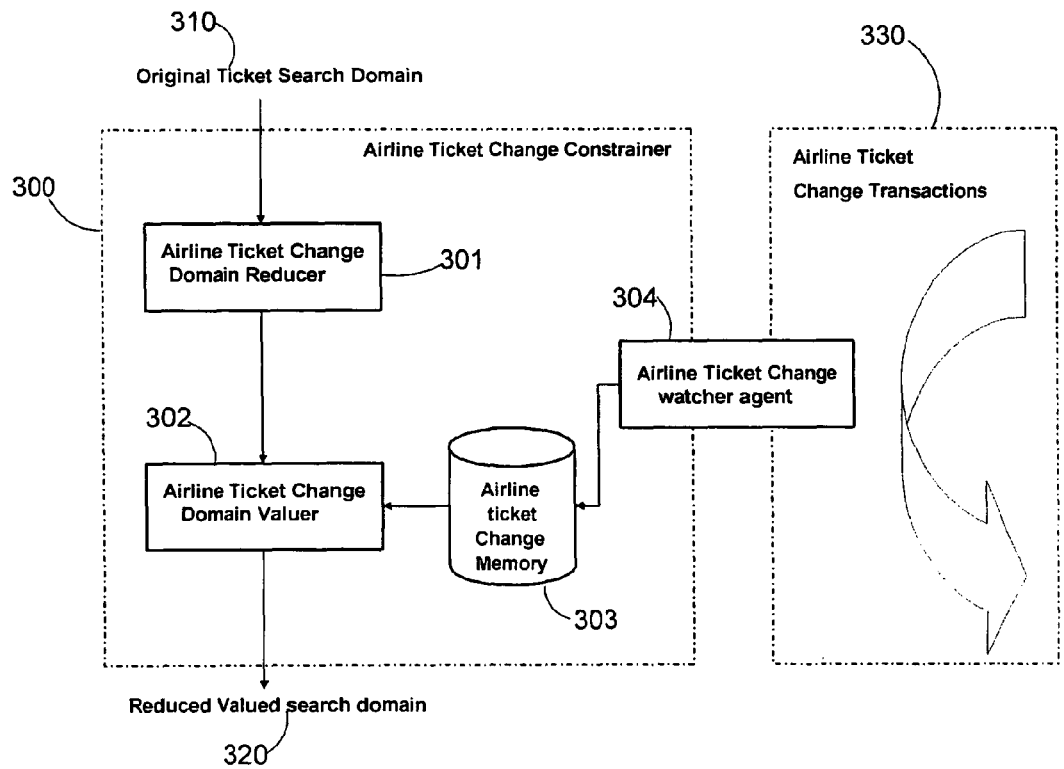
FIG. 3 depicts an airline ticket change constrainer according to the invention that permits a drastic reduction of the change opportunities to be retained when re-issuing or revalidating an airline ticket

FIG. 3 describes the "airline ticket change constrainer" (300), the component of the invention that permits a drastic reduction in the change possibilities to be retained from the original ticket. The airline ticket change constrainer is aimed at reducing, i.e., cutting, the search domain on the basis of the change conditions attached to the original ticket. Hence, it allows reissuing or revalidating a ticket without having to consider every piece of the huge amount of potentially available input data:

it takes advantage of the very restrictive constraints set by the change restrictions of the original ticket allowing to cut invalid parts of the search domain;

the remaining potential parts of the search domain are then valued (i.e., weighted, as it is further discussed in the following description) in order to discriminate among solutions that would be equivalent in term of fare amounts. Hence, if two potential solutions return the same fare amount, the one with the highest weight value is explored first.

The airline ticket change constrainer can be used with various levels of constraints set for the input domain to search:

with no constraint on the search domain;
with fare constraints;
with route constraints;
with flight constraints;
with a combination of these constraints;

In input (310), the airline ticket change constrainer thus requires:

an original ticket being reissued in order to retrieve the change conditions;
the description of the current search domain.

The pricing method becomes a part of the solution domain which is organized with seven degrees of freedom:

new possible dates,
new origin,
new destination,
new routes,
new flights,
new possible fares, and pricing methods.

Therefore, the input of the airline ticket change constrainer, which makes use of graphs as further discussed in the description of the invention, is finally:
- the original ticket;
- new departure dates range;
- new origins;
- new destinations;
- new graph of routes and dates;
- new flights graph for a given combination of route and date;
- new pricing method graph;
- new fares graph.

As far as the output (320) of the airline ticket change constrainer is concerned it consists in:
- a description of the new solutions domain after reduction (new constraints have been activated thanks to the constraints got in input);
- a valuation or weighing of the remaining potential solution regarding their potential success.

So as to get:
- valued new departure dates range;
- valued new origins;
- valued new destinations;
- valued new (date, route) graph;
- valued new flights graph;
- valued new pricing method graph;
- valued new fares graph.

To achieve this, the airline ticket change constrainer (300) is comprised of following four main components:
- An airline ticket change domain reducer (301) which is aimed at reducing the search domain on the basis of the change conditions specified on the original ticket. This component is further described in FIG. 4.
- An airline ticket change domain valuer (302) aimed at attributing a weight to:
  - each date of the date range; and, for the graphs returned by the change domain reducer (301):
  - each arc of the (date, route) graph;
  - each arc of the pricing method graph;
  - each arc of the fare graph;
  - each arc of the flight graph.

The valuation is based on the pricing popularity score as computed by the airline ticket change watcher agent (304) shown below, and stored in the airline ticket change memory: (303), also shown hereafter. As soon as a solution is linked to a unique pricing method, it inherits the corresponding pricing method score from it. Purpose of the valuation is to discriminate between potential solutions sharing same fare amounts but with different attached change restrictions.
- An airline ticket change memory (303) structured to obtain a synthetic view of the information stream related to the change transactions which are handled by the system. It is further described in FIG. 5. Purpose of the memory is to link a popularity score, also discussed hereafter, to a given pricing method in a given context. The context is determined by a set of key parameter values including a:
  - carrier constraint;
  - flight departure date constraint;
  - passenger departure date constraint;
  - a route constraint;
  - fare construction constraint.
- An airline ticket change watch agent (304) further described in FIG. 6. Its role is to watch the airline ticket change transactions (330) in order to detect which pricing method is used in a given context. When a pricing method is used its popularity score, in the given context, is increased. Popularity score is updated in the here above airline ticket change memory where it is saved. The airline ticket change watch agent runs asynchronously on a subset of the transactions.

Figure 4:
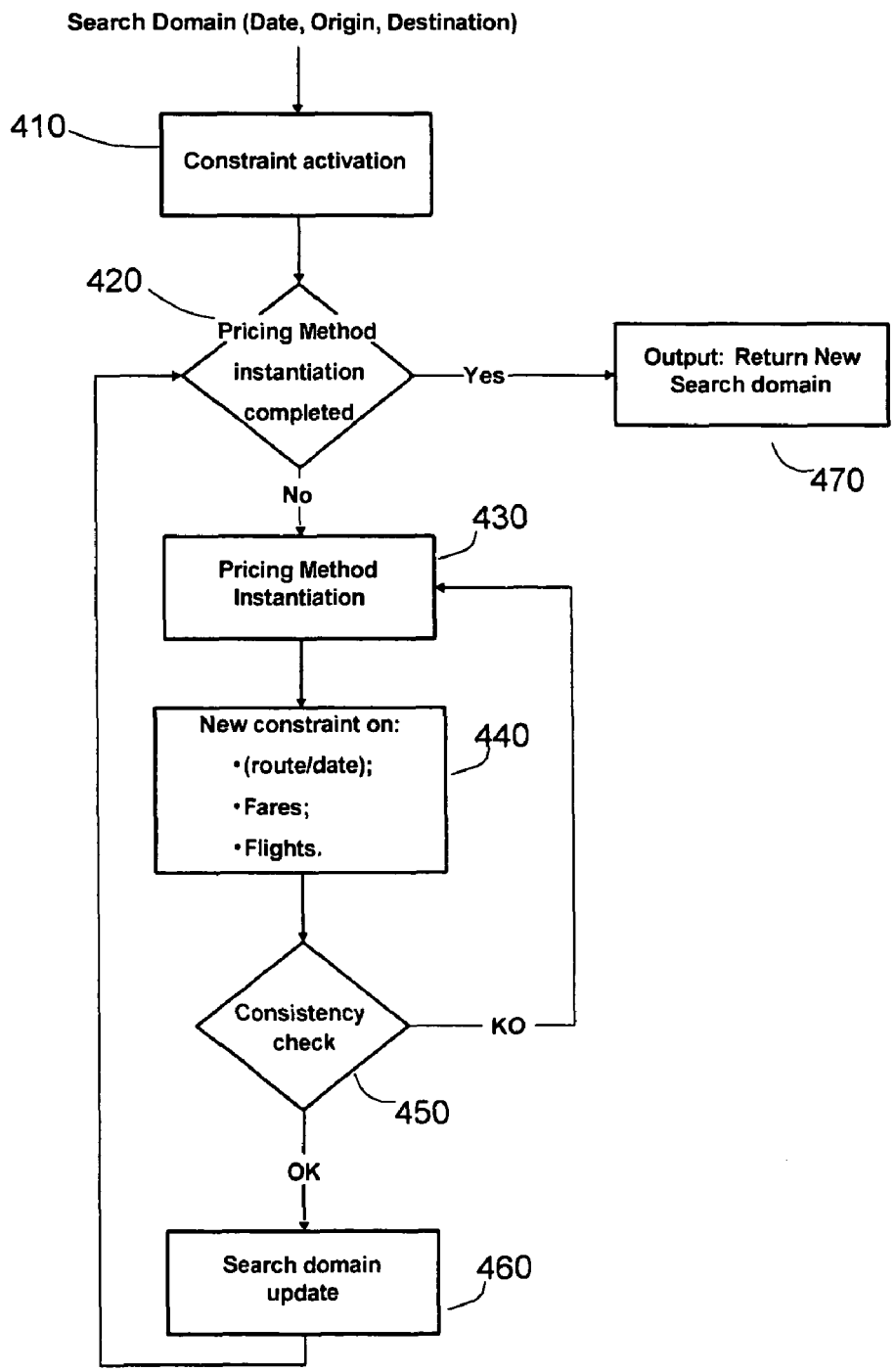
FIG. 4 is a flow chart of the operations performed by the airline ticket change domain reducer, a component of the airline ticket change constrainer.

FIG. 4 is a flow chart of the operations performed by the airline ticket change domain reducer (301), part of the change constrainer (300) shown in FIG. 3, to cut the search domain.

On the basis of the original ticket and of the changes requested all constraints are activated (410) which allows looping (420) through all relevant pricing methods. Each relevant pricing method is in turn instantiated (430) so that new constraints on route/dates, fares and flights can be set (440). After consistency of set constraints have been checked (450) the search domain can actually be updated (460), i.e.: reduced.

Once pricing methods have all been tried the airline ticket change domain reducer can return the new (reduced) search domain (470).

Figure 5:
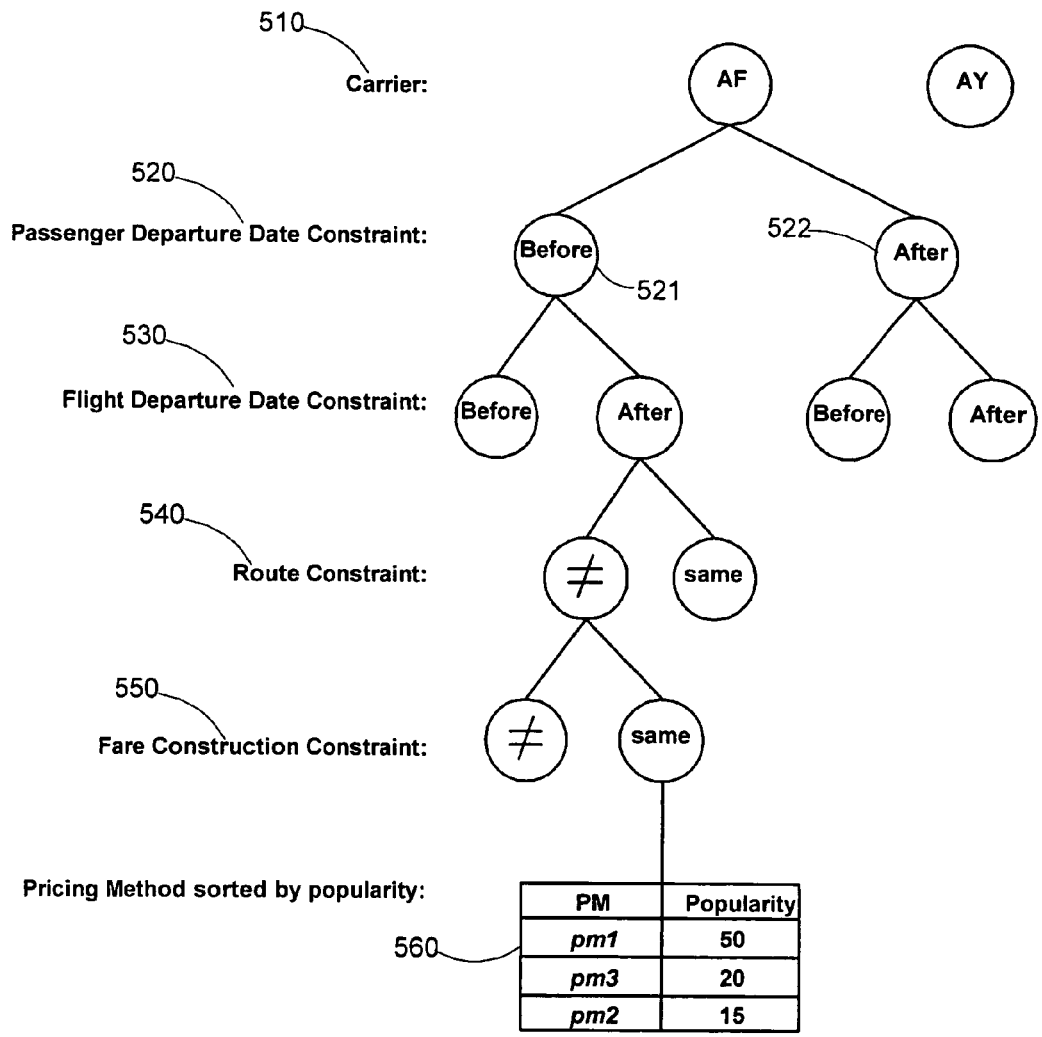
FIG. 5 depicts the structure of the airline ticket change memory, another component of the airline ticket change constrainer.

FIG. 5 depicts the structure of the airline ticket change memory (303), a component of the change constrainer (300) shown in FIG. 3

The memory is organized under the form of trees where roots (510) are the carriers, i.e., the airline companies. As mentioned in FIG. 3, purpose of the memory is to establish a link between a popularity score and a given pricing method, here shown under the form of table (560), in a given context. The context is determined by the constraints that were set to reduce the search domain. On top of the carriers that are at roots of the trees, the other constraints deal with the passenger departure date (520). This constraint consists in checking if the passenger departure date is before (521) or after (522) the date at which change is requested. In a similar way, the third constraint (530) deals with the flight departure date. Also, route (540) and fare construction (550) constraints are considered for the context, checking if they are the same or different.

Figure 6:
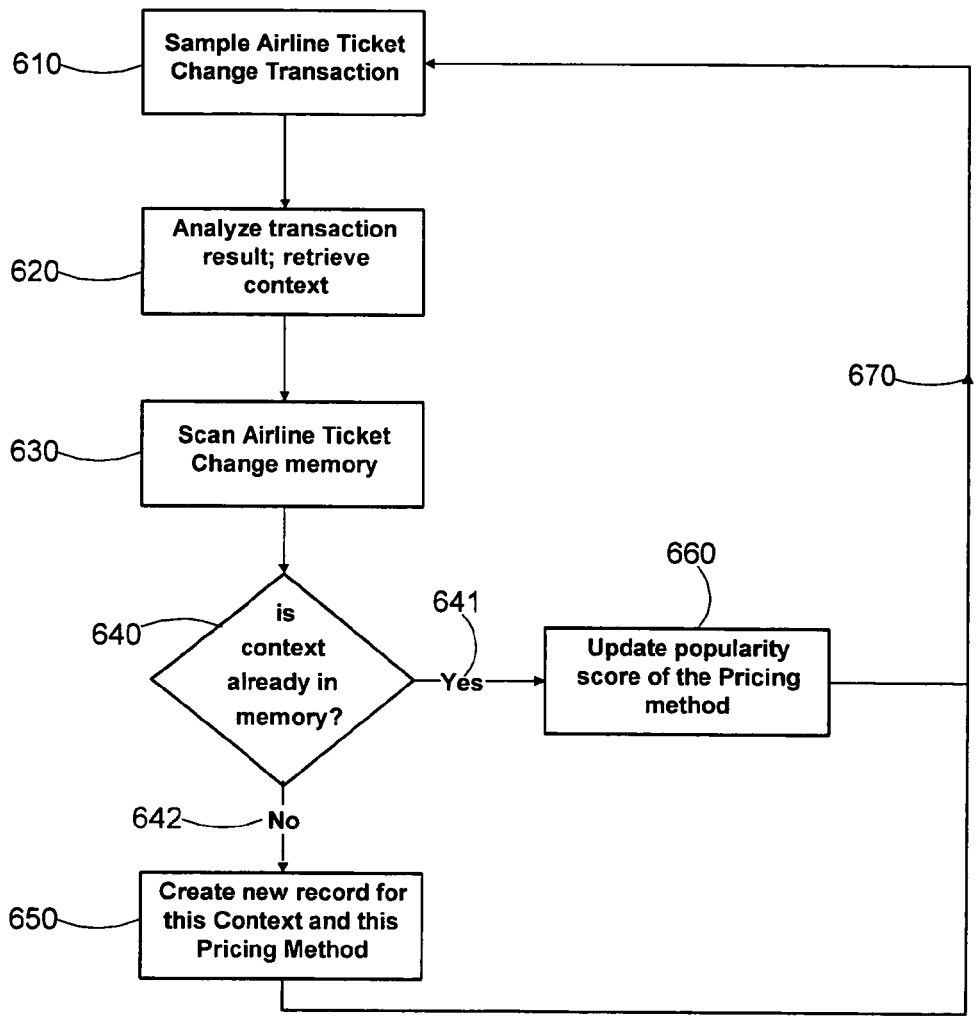
FIG. 6 is a flow chart of the operations performed by the airline ticket change watch agent (304), yet another component of the airline ticket change constrainer.

FIG. 6 is a flow chart of the operations performed by the airline ticket change watch agent (304), another component of the change constrainer (300) shown in FIG. 3, aimed at watching the airline ticket change transactions.

The watch agent works on samples (610) of the change transactions actually handled by a system making use of the invention. Samples are, for example, randomly selected. The following step (620) analyzes the transaction to retrieve its context. Then, the airline ticket change memory (303) discussed in FIG. 3 and in FIG. 6 is scanned (630) to check (640) if the current context is already in it or not. If not (642) a new record for the current context and pricing method must be created (650). If already present in memory (641) the popularity score of the pricing method is updated (660). In both cases, flow chart loops (670), thus returns to first step (610) from where a new transaction sample can be analyzed.

Figure 7:
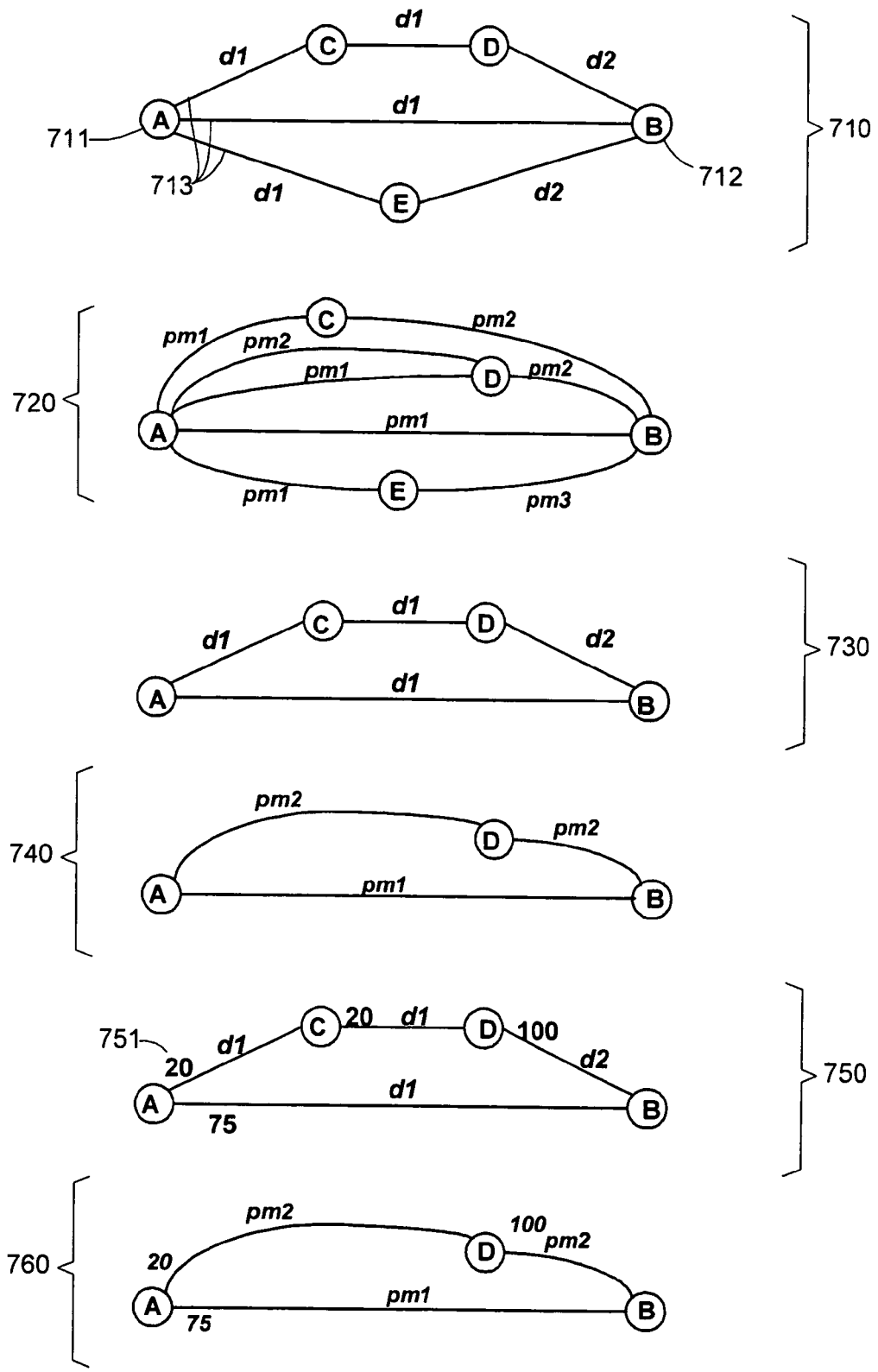
FIG. 7 shows through a particular example how the search domain of change opportunities is reduced.

FIG. 7 shows through a particular example how the search domain of change opportunities is reduced.

The example of this figure considers a change request for a one-way trip from city A to city B for a given departure date (d1). First, a (date/route) graph (710) is produced by a standard fare-driven product to get all possibilities of flying from city A (711) to city B (712), departing on day d1 (713). The graph nodes are the cities and graph arcs carry the dates. This includes the options of having to make one or two stopovers (cities C, D and E) and arrive the day after (d2) A pricing method graph is also produced (720) of all possible pricing methods (pm) that can possibly considered for flying between A and B.

Then, the air ticket change constrainer is able to reduce significantly the search domain by taken into consideration the change conditions attached to the original ticket to be reissued or revalidated. Change conditions that apply in this particular example are:

a stopover through E is not allowed pm1 cannot combined with pm3 pm1 can only apply on a through fare (A to B)

In which case the (date/route) graph (710) is reduced as shown (730) and pricing method graph (720) can be much simplified (740), thus drastically reducing the search domain. In this example, the only pricing method considered between A and D is pm2. Following definition of pm2 (100) as shown in FIG. 1, this means it is not worth loading today fares on the considered market. On the A-D market, the fares domain is reduced by a factor of two.

Moreover, each remaining route of the graphs is valued (i.e., weighed) as shown (750, 760) on the basis of its popularity score previously discussed, e.g.: (751). Then, the weighing of the different route of the graphs allows discriminating among two routes corresponding to the same fare amount. In this example, the route A-D-B weighs 20 (minimum weight value on the route), the route A-B weighs 75; the airline ticket change constrainer indicates that the direct route A-B is the most successful. This information can be then used to drive the domain exploration of the fare-driven search engine.

Figure 8:
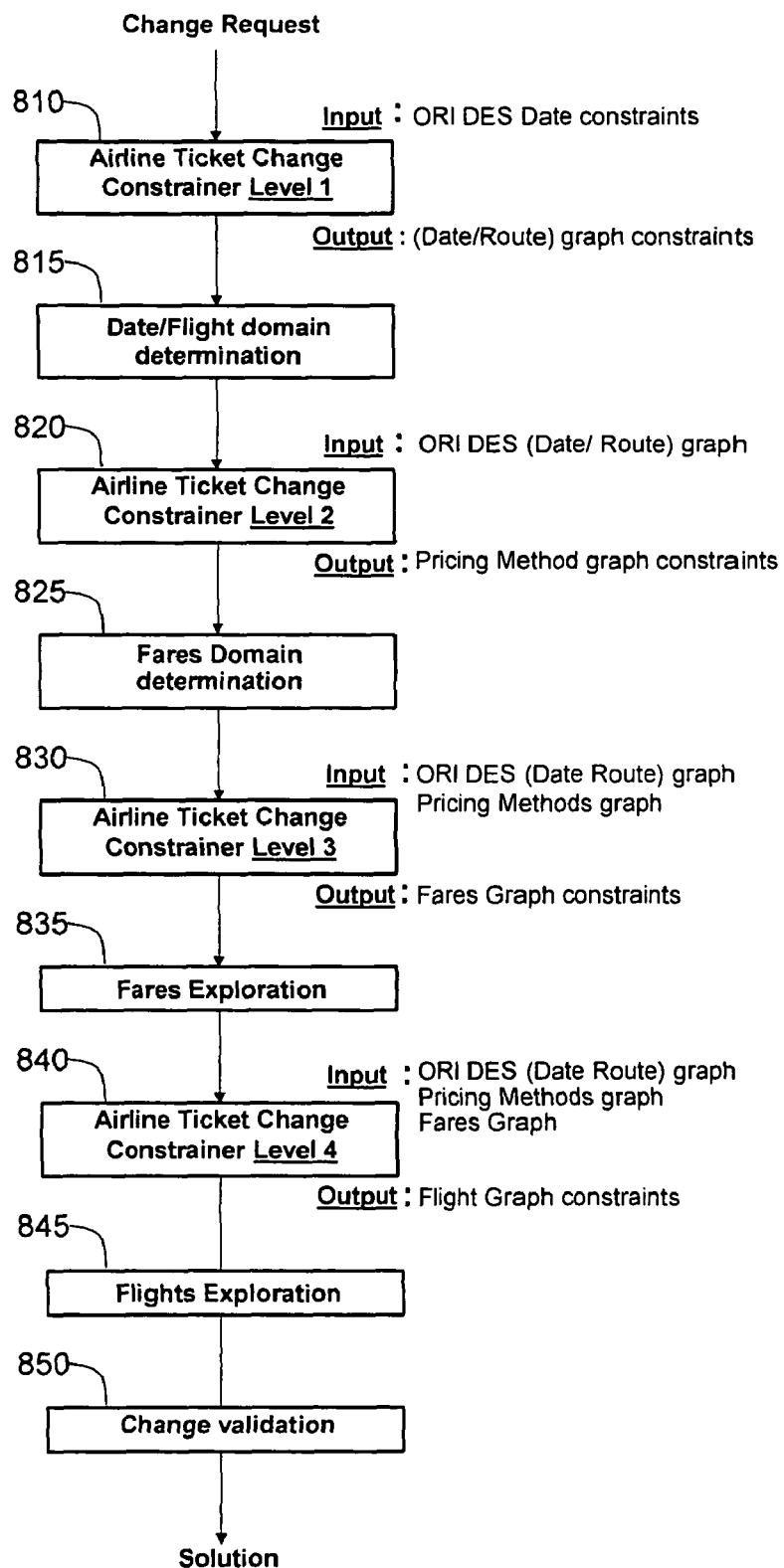
FIG. 8 shows how the airline ticket change constrainer is used to implement a fare-driven online ticket changer.

FIG. 8 shows how the airline ticket change constrainer described in previous figures is used to implement a fare-driven online ticket changer which does not require the expertise of a travel agent when a casual end-user of such a site wants to change an airline ticket that has already been issued. This process applies whichever ticket must be reissued or revalidated. The fact that ticket is re-issued or just revalidated is however made transparent to the end-user. Also, since this latter is not assumed to have in any way the expertise of a travel agent, all change conditions specified by the airline standards are automatically adhered to as a result of the use of the change constrainer according to the invention.

As shown in FIG. 8 the airline ticket change constrainer is called each time a new level of constraints is considered. At level 1 (810), on the basis of the date constraints obtained from the change request a (date/route) graph of constraints, of kind shown in previous figure, is produced so that a date/flight search domain can be determined (815). Then, at level 2 (820), on the basis of the here above graph used as input, the airline ticket change constrainer produces a pricing methods graph of constraints which allows determining a domain of fares (825). At level 3 (830), the two above graphs serve in turn as input to the airline ticket change constrainer to get another graph of constraints on fares so that an exploration of selected fares (835) is performed. Finally, a further call at level 4 (840), using all previous graphs as input, produces a flight graph of constraints allowing an exploration of selected flights (845) that constitute the set of solutions proposed to the end-user once they have been validated (850).

Figure 9:
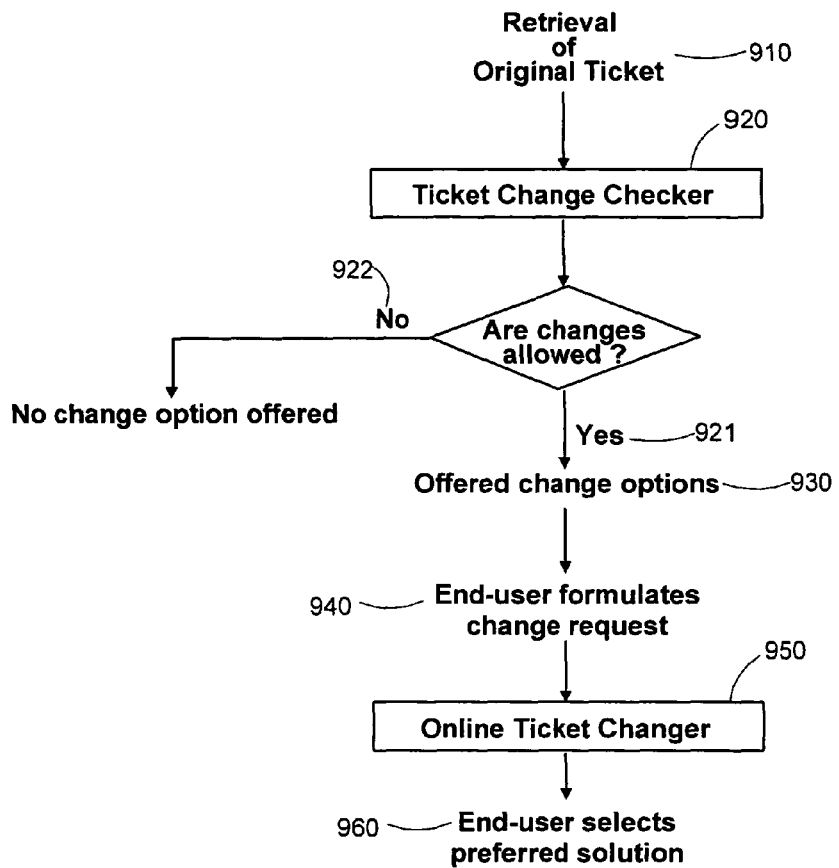
FIG. 9 depicts the overall processing flow of a ticket change request according to the invention.

FIG. 9 depicts the overall processing flow of a ticket change request according to the invention. The request leads to reissue or to revalidate a ticket that has been previously issued without requiring the expertise of a travel agent, thus can be conducted by the casual end-user of an online travel site.

Once the original ticket has been retrieved (910) a ticket change checker (920) is first called in order to verify that changes are actually allowed. If not (922), no change option is offered thus making clear immediately to the end-user that reissuing or revalidating of the original ticket is not permitted.

If changes are allowed (921), change options are offered to the end-user (930). From them, the end-user can then formulate a change request which is used as input by the online ticket changer (950) described in FIG. 8.

A set of solutions that adhere to the airline industry standards is then proposed to the end-user who is just left with the choice of picking up a particular solution (960).

Figure 10:
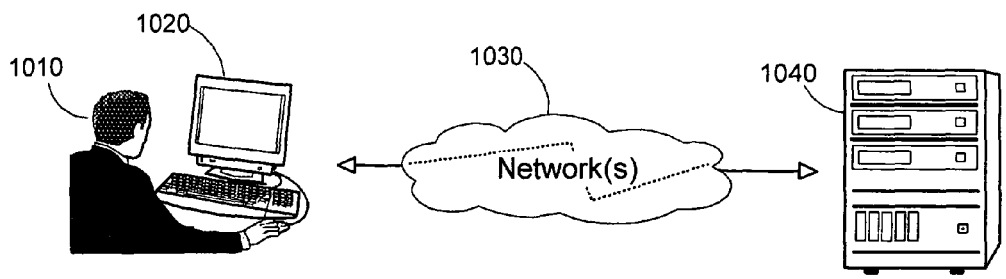
FIG. 10 described the environment in which the invention is carried out.

FIG. 10 described the environment in which the invention is carried out. An online ticket changer according to the invention is implemented on a computer-based system (1040) of the kind used by travel service providers and airlines companies to set up their travel sites so that an end-user (1010) can remotely access it to perform any travel related transaction like booking a trip or, using the online ticket changer of the invention, changing an already issued ticket.

Computer-based system (1040) can be anything from a stand-alone computer to a cluster of redundant servers including large or very large computers referred to as main-frames capable of operating in a 24 hour-a-day, 7 day-a-week mode.

End user (1010) is, e.g., an individual using a personal computer (1020) equipped with any form of navigation tool capable of accessing a travel site hosted on a computer-based system (1040) through a network or a combination of private and/or public networks (1030) including the Internet. The end-user is as well a travel agent in a travel agency remotely using the computer resources of its service provider.

In the here above description of the invention following stands for:

The airline ticket change constrainer (300) is the constraining system that uses, as input, the travel opportunities returned by a fare-driven search engine. The constraining system includes:

An airline ticket change domain reducer (301); i.e., the means for reducing, i.e., cutting, the domain of change opportunities produced by the fare-driven search engine.

An airline ticket change domain valuer (302); i.e., the means for valuating the reduced domain of change opportunities, output of the above reducing means.

What is claimed is:

1. A low fare-driven search system, comprising:

a computer executing software constraining an input search domain of change opportunities provided by the fare-driven search system while reissuing or revalidating an already issued airline ticket, the system further including a means for reducing; and a means for valuating, wherein, said means for reducing is cutting the input search domain of change opportunities on the basis of change conditions set in the already issued ticket by said computer;

and said means for valuating being arranged for:

weighing, by said computer, the change opportunities of the reduced search domain; and returning a reduced valued search domain of change opportunities;

thereby, allowing to offer a set of travel opportunities meeting all change conditions of the already issued ticket, wherein said means for valuating is weighing the change opportunities on the basis of pricing method popularity scores updated in a ticket change memory by a ticket change watcher agent from actual change transactions handled by the system.

2. The system of claim 1, wherein the change conditions include pricing methods of the airline industry.

3. The system of claim 1, wherein the input search domain of change opportunities is produced by a non-constraining fare-driven search engine on the basis of a ticket change request issued by an end-user of the system.

4. The system of claim 1, wherein the reduced valued search domain of change opportunities returned by the constraining system always includes a lowest fare opportunity compatible with the change conditions set in the already issued ticket.

5. The system of claim 1, wherein the search domains of change opportunities are organized under the form of date/route graphs and pricing method graphs.

6. The system of claim 1, including a front-end system to first check if the already issued ticket is permitted to be changed and, if permitted, what are the offered change options.

7. The system according to claim 1, implemented as part of a travel web site hosted on the computer-based system and made accessible to an end-user of the travel web site through a network in any combination of private and/or public networks.

8. A method for reissuing or revalidating an already issued airline ticket in a low fare-driven search engine, including a computer system constraining an input search domain of change opportunities provided by the fare-driven search engine, comprising:
  reducing, by said computer system, the input search domain of change opportunities on the basis of change conditions set in a already issued ticket;
  weighing ,by said computer system, the change opportunities of the reduced search domain on the basis of pricing method popularity scores;
  returning a reduced valued search domain of change opportunities, thereby, allowing to offer a set of travel opportunities meeting all change conditions of the already issued ticket; and
  getting pricing method popularity scores updated in a ticket change memory by a ticket change watcher agent from actual change transactions handled by the travel system.

9. The method of claim 8, wherein the change conditions include pricing methods of the airline industry.

10. The method of claim 8, wherein the input search domain of change opportunities is produced by a non-constraining fare-driven search engine on the basis of a ticket change request issued by an end-user of the travel system.

11. The method of claim 8, wherein the reduced valued search domain of change opportunities returned by the ticket change constrainer always includes a lowest fare opportunity compatible with the change conditions set in the already issued ticket.

12. The method of claim 8, wherein the search domains of change opportunities are organized under the form of date/route graphs and pricing method graphs.

13. The method of claim 8, including the preliminary step of: checking if the already issued ticket is permitted to be changed and, if permitted; offering change options.

14. A non-transitory computer readable recording medium with a computer program recorded thereon, comprising computer readable code means for causing at least one computer to operate a method reissuing or revalidating an already issued airline ticket in a low fare-driven search engine, including a system for constraining an input search domain of change opportunities provided by the fare-driven search engine, comprising
  reducing via computer system the input search domain of change opportunities on the basis of change conditions set in the already issued ticket;
  weighing the change opportunities of the reduced search domain on the basis of pricing method popularity scores;
  returning a reduced valued search domain of change opportunities, thereby, allowing to offer a set of lower cost travel opportunities than the fare of the already issued airline ticket, meeting all change conditions of the already issued ticket; and
  getting pricing method popularity scores updated in a ticket change memory by a ticket change watcher agent from actual change transactions handled by the travel system.

* * * * *